Jan. 16, 1940.   H. P. FARIS ET AL   2,187,140
CARPET
Filed Sept. 25, 1939
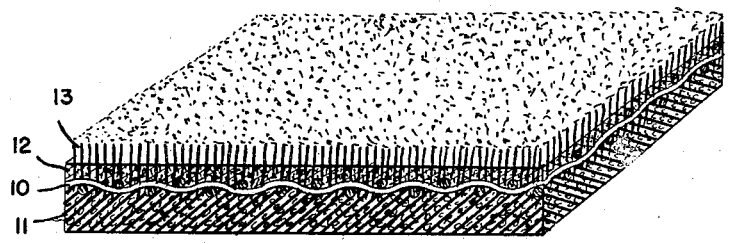
INVENTORS
HAROLD P. FARIS
DANIEL W. YOCHUM
RUSSELL B. LOGAN
BY
Whittemore, Hulbert & Belknap ATTORNEYS Patented Jan. 16, 1940

2,187,140

UNITED STATES PATENT OFFICE 2,187,140

CARPET

Harold P. Faris, Philadelphia, Pa., and Daniel W. Yochum and Russell B. Logan, Trenton, N. J., assignors to National Automotive Fibres, Inc., Detroit, Mich., a corporation of Delaware Application September 25, 1939, Serial No. 296,481

7 Claims. (Cl. 154—49)

The present invention relates to a floor covering and more particularly to a cemented flock carpet integrally combined with an under-padding of sponge rubber, or the like.

The present application is a continuation in part of our copending application, Serial No. 260,664, entitled "Carpet," filed March 8, 1939.

In the manufacture of flock floor covering one of the primary essentials is to secure the flock permanently to the floor covering. In the past, efforts to accomplish this result have been only partially successful for a number of reasons.

According to prior practices, flocked floor covering have been manufactured and have been used with underpaddings of various natures, such for example as felt pads. The pads have been used as an entirely separate element in some cases, and in other cases they have been adhesively secured to the under side of the flocked floor covering after completion of the latter.

We have found that it is possible to manufacture integrally formed padded flocked floor covering in which the under-padding is a layer of sponge rubber. This results in a unitary structure, and further we have found that the flock is much more securely anchored than in previously known constructions.

Briefly described, the floor covering which forms the subject matter of the present application comprises an intermediate ply of an open woven fabric such for example as burlap. In the manufacture of the article a fairly thick ply of unvulcanized blowing rubber stock, (or its equivalent, as will be later described) is calendered to one surface of the burlap. As a result of this operation, the unvulcanized rubber stock is forced into the openings or interstices in the woven fabric. A relatively thin layer of adhesive cement, in plastic condition, is next placed on the other side of the woven fabric. The cement is of a nature compatible with rubber, and preferably contains solvents adapted to soften the upper surface of the blowing rubber stock. The flock pile material is then sifted downwardly onto the exposed cement coated surface while the same is vibrated. As a result of the vibration, the flock is substantially embedded into the cement and at least partly penetrates the cement and is embedded in the upper surface of the rubber stock.

Vulcanization is then carried out in a carefully controlled manner to cause initial blowing of the rubber stock to form sponge rubber and simultaneously to vulcanize the completed article. As a result, the sponge rubber is vulcanized to the woven fabric, and is vulcanized also through openings in the fabric to the cement. In addition the flock is secured in the cement and to some degree is secured directly in the sponge rubber.

With the foregoing general description in mind, it is an object of the present invention to provide a novel integral floor covering having a lower ply of sponge rubber vulcanized thereto.

It is a further object of the present invention to provide a floor covering comprising an open fabric having on one side a layer of sponge rubber and on the other side a layer of flexible cement, the two layers being bonded to each other through interstices in the fabric.

It is a further object of the present invention to provide a floor covering comprising a lower ply of sponge rubber, an intermediate ply of open fabric and an upper ply of a cement having flock deeply embedded therein and at least partly passing therethrough.

Other objects of the invention will be apparent as the description proceeds, and when taken in conjunction with the accompanying drawing wherein:

The figure is a perspective view partly in section showing our novel floor covering material. In our copending application referred to above, we have illustrated and claimed specifically the apparatus for manufacturing the novel floor covering shown here.

In the present application the floor covering comprises an intermediate ply of a woven fabric 10 which may, for example, be burlap. Beneath the burlap and integrally vulcanized thereto is a relatively thick ply of sponge rubber 11. The sponge rubber 11 substantially fills the openings in the burlap 10, as will be understood when it is appreciated that the sponge rubber stock before vulcanization is calendered to the fabric. Over the fabric 10 is a relatively thin coating of cement 12. Excellent results follow the use of about .030 inch of cement. Penetrating this cement and in some instances passing entirely through the cement and into the upper surface of the sponge rubber are pile elements 13 applied in the form of flock and vibrated into substantially upstanding positions as shown in the figure.

The material illustrated is characterized largely by the permanence with which the flock pile is retained thereon, and this in large measure we attribute to the use of the sponge rubber in the initial formation of the carpet.

The cement which we have found most suitable for the manufacture of this device comprises approximately 25 parts of reclaimed rubber, 25 parts of ester gum, with about 50 parts of solvent. Other resins, such for example as rosin, Burgundy pitch, balata resin, or cumar R. H. may be substituted. Also, of course, crude rubber may be substituted for reclaimed rubber. Further, satisfactory results have been obtained by employing rubber without any resins. Instead of natural rubber, synthetic rubber, such as Neoprene or the like may be employed.

We have preferred, however, to employ the combination of rubber and resin in the cement for the reason that a cement of this type may contain a much higher percentage of solids and still be substantially fluid. It is also possible, of course, to provide suitable pigment in order to color the cement. In the event it is desired to produce a floor covering having any particular color, the flock may be dyed or otherwise colored prior to its attachment to the carpet, or, if preferred, the coloring operation may follow assembly of the carpet.

We have found that the flock is retained with remarkable firmness in the deposited rubber, and tests indicate that a vulcanized bond exists between the flock 13 and the vulcanized sponge rubber 11. Thus for example when a section of flock is mechanically torn from its base, we find that the bond is disrupted within the sponge rubber, indicating that there is a permanent vulcanized bond between the cement 12 and the rubber 11.

Evidently the solvents which are present in the cement tend to soften the upper surface of the blowing rubber stock with the result that there is no distinct separation between the two, but instead the two merge one into the other through the interstices of the fabric. In like manner, due to the softening of the upper surface of the blowing rubber stock, some of the pile is found to have completely penetrated the cement and to have embedded itself in the upper surface of the sponge rubber. In the figure we have illustrated certain of the pile elements as extending below the fabric.

Furthermore, the softening of the upper surface of the sponge rubber stock has a further beneficial result in that it substantially improves blowing of the stock. We have found that it is essential that the stock be of such a nature that the blowing is substantially completed before vulcanization takes place. It is further essential that the burlap and the adhesive coated fabric remain porous so long as blowing is taking place. Otherwise blowing of the sponge rubber stock causes a mechanical separation between the burlap and the stock.

The flock which is employed may be hair or other generally unspinnable fibers. Thus the economy of the product is substantially increased, since fibers of this nature are relatively inexpensive. At the same time, it has been found that fibers of this nature are better suited to the product than fibers of spun yarn, such as wool, rayon, cotton or the like, although these last, or mixtures of them may be employed.

Earlier, we referred to equivalent materials to be substituted for the sponge rubber. Obviously, a dense rubber could be employed. This would serve the same function in rendering the final product integral, by vulcanizing to both the fabric and the cement. It would be less springy or yielding than sponge, but for some purposes this may be an advantage.

It will be recognized of course that either natural or synthetic rubber may be used, or any other material exhibiting the necessary properties of resilience and ability to bond permanently.

Good results may also be obtained by providing relatively large amounts of filler, such as comminuted cork, jute or other fibers, or the like. These may add materially to the economy of the product without seriously affecting its desirable qualities.

We have found that the herein described product exhibits substantial important advantages over similar products known to the prior art. The padding material in the form of sponge rubber substantially increases the life of the product. The surface appearance is improved due to the fact that it is absolutely uniform and is not streaked as sometimes occurs in woven fabrics or cemented pile fabrics made according to known methods. The flock pile exhibits superior wearing qualities, due to the fact that it may be of a nature such for example as goat hair. The product further exhibits wearing qualities due to the superior strength of the bond as before described.

Furthermore, the final product is absolutely self-leveling and need not be adhesively secured to a flat surface. It may be die cut to any predetermined size and shape, and, if desired, a binding may be applied, either sewed or otherwise secured. The floor covering is integral as opposed to some previous constructions in which a pad was adhesively secured to the carpet after completion. In this case the pad serves the double function of increasing the wearing qualities of the completed product, together with an increase in the resiliency thereof, and also, as previously pointed out, it increases materially to the strength of the bond with which the flock is attached. The texture of the product will, of course, vary with the nature of the fibers employed, and a proper selection may be made between stiff, hard fibers or relatively soft fibers, or a suitable combination of the two. Tests indicate that the product is long wearing, and due to the presence of the sponge rubber under-pad provides a desirable softness under foot. We have referred to the fact that the cement and the flock may be colored as desired, and it will be appreciated, if preferred, in some instances patterns may be printed or otherwise applied to the surface of the completed product.

The thickness of the sponge rubber base may vary within rather wide limits. For ordinary use, it should be about .250 inch or a little thicker. Within reasonable limits, increase in thickness increases the softness of the article as a whole, but at a proportionately greater material expense.

The pile elements 13 as disclosed in the aforesaid parent application Serial No. 260,664 are pre-cut to predetermined length. We have referred to the pile forming material as "flock" for the reason that the manner of its application to the cement, fabric, and blowing rubber base is in some respects similar to prior flocking processes. In the past finely ground fibrous material or dust has been adhesively united to backings. A familiar example is in the manufacture of flocked or coated wall paper. Our pile forming material is to be sharply distinguished from this known material. As disclosed in our aforesaid parent application, our pile forming material is in the form of pre-cut fibers of substantial length. We have disclosed pile forming elements 13 as of sufficient length to penetrate completely through a cement having a thickness on the order of .030 inch and into the upper surface of the sponge rubber base, and, as shown in the drawing, these elements 13 extend in substantially upstanding position for a substantial distance above the upper surface of the cement. Furthermore, as before stated, the pile elements are preferably at least in part cut from relatively stiff, relatively coarse fibers such as goat hair.

As illustrated in the figure and as will be obvious from the foregoing description, the pile elements 13 are separately embedded in and bonded to the cement, and form a pile surface composed of individual generally upstanding pile fibers. It should, therefore, be understood that when we use the term "flock" in our application, we do not mean that we are using comminuted, powdered, or ground particles, but we refer to fibers that have been pre-cut to predetermined length.

We have previously described the sponge rubber base as applied in the form of a fairly thick ply of unvulcanized blowing rubber stock. This material is applied to the open weave fabric by a calendering operation. Rubber of this general type is well known and is to be sharply distinguished from a whipped froth or foam of latex or aqueous dispersions of rubber. For simplicity, we refer to the rubber sponge employed in our product as "blown" sponge, and by this we mean to identify a sponge rubber blown into a sponge condition by the application of heat during vulcanization, as distinguished from a sponge in which the cells are formed by whipping an aqueous rubber dispersion prior to vulcanization. It may be observed that the unvulcanized blowing rubber stock which we employ is of a well known type and is relatively dense and may be united with an open weave fabric by calendering.

While we have in this application specifically described a single embodiment which our invention may assume in practice, it will be understood that the same is shown for purposes of illustration only and that the invention may be further modified and embodied in various other forms without departing from the spirit or scope of the appended claims.

What we claim as our invention is:

1. A floor covering comprising a ply of open woven fabric, a ply of sponge rubber pressed to one side of the fabric with sufficient pressure to force rubber into the interstices of said material and vulcanized to said fabric, an adhesive coating over the opposite side of said fabric, and pile material carried by said coating, said pile material being individual upstanding fibers having ends embedded in said coating.

2. As an article of manufacture, an integrated floor covering comprising a reinforcing fabric of open weave, a base of blown sponge rubber calendered to said fabric and blown and vulcanized to said fabric in place, a ply of cement overlying said fabric and sponge rubber base, said cement comprising rubber and resin in a solvent, said cement and said sponge rubber base being intermingled where they meet so as to form an intermediate blended zone whereby there is no distinct plane of cleavage between said cement and said sponge rubber base, and a tread surface of individual upstanding pile fibers embedded at one end in said cement and having upstanding pile forming portions extending above the upper surface of said cement, at least some of the said pile fibers being relatively stiff and relatively coarse.

3. As an article of manufacture, an integrated floor covering comprising a reinforcing fabric of open weave, a base of blown sponge rubber, said rubber base applied to one side of said fabric with sufficient pressure to force rubber into the interstices of said fabric and vulcanized to said fabric, a flexible cement comprising rubber and resin in a solvent overlying said fabric and sponge rubber base, said cement and said sponge rubber being intermingled where they meet to form an intermediate blended zone whereby there is no distinct plane of cleavage between said cement and said sponge rubber base, and a tread surface of individual upstanding pile fibers embedded at one end in said cement and having upstanding pile forming portions extending above the upper surface of said cement, at least some of said pile fibers being relatively stiff and coarse.

4. As an article of manufacture, an integrated floor covering comprising a resilient rubber base, a reinforcing fabric of open weave overlying said base, a ply of cement overlying said fabric, and a tread surface of individual upstanding pile fibers embedded at one end in said cement, said rubber base being formed of sponge rubber calendered to said fabric and blown and vulcanized in place, said base being bonded directly to said cement at the openings in said fabric.

5. As an article of manufacture, an integrated floor covering comprising a reinforcing fabric of open weave, a base of blown sponge rubber, said base applied to one side of said fabric with sufficient pressure to force rubber into the interstices of said fabric and vulcanized to said fabric, a ply of cement overlying said fabric and rubber base, a tread surface of individual upstanding pile fibers embedded at one end in said cement, said cement being permanently bonded to the material of said base at the openings in said fabric, said cement and said base having an intermediate blended zone where they abut whereby there is no distinct plane of cleavage between the cement and base, the pile fibers of said tread surface penetrating into said blended zone.

6. As an article of manufacture, an integrated floor covering comprising a reinforcing fabric of open weave, a base of blown sponge rubber, said base applied to one side of said fabric with sufficient pressure to force rubber into the interstices of said fabric and vulcanized to said fabric, a ply of cement overlying said fabric, a tread surface of individual upstanding pile fibers embedded at one end in said cement, said cement being permanently bonded to the material of said base at the openings in said fabric, at least some of the pile fibers of said tread surface penetrating into the upper surface of said base material.

7. As an article of manufacture, an integrated floor covering comprising a reinforcing fabric of open weave, a base of blown sponge rubber applied to one side of said fabric with sufficient pressure to force rubber into the interstices of said fabric, a ply of cement overlying said fabric, and a tread surface of individual upstanding pile fibers embedded at one end in said cement, said cement contacting the sponge rubber base at the openings in said fabric and being of a type adapted to merge with the upper surface of said sponge rubber before vulcanization and to soften the same to increase the blowing of said sponge rubber, said cement and said sponge rubber being vulcanized together.

HAROLD P. FARIS.
DANIEL W. YOCHUM.
RUSSELL B. LOGAN.